United States Patent [19]

Wilson

[11] 4,162,006
[45] Jul. 24, 1979

[54] MAGNETIC DISKETTE MAGAZINE

[75] Inventor: David R. Wilson, Rochester, Minn.

[73] Assignee: International Business Machines Corporation, Armonk, N.Y.

[21] Appl. No.: 888,435

[22] Filed: Mar. 20, 1978

[51] Int. Cl.$^2$ .............................................. B65D 85/30
[52] U.S. Cl. .................................. 206/444; 206/454; 312/10
[58] Field of Search ............... 206/444, 309, 311, 387, 206/455, 454, 303, 815, 312; 220/331, 322; 221/83; 312/10; 353/116

[56] References Cited

U.S. PATENT DOCUMENTS

| 2,725,143 | 11/1955 | Linebaugh et al. | 206/309 |
| 2,760,839 | 8/1956 | Martin | 312/10 |
| 2,942,365 | 6/1960 | Badalich | 353/116 |
| 3,135,383 | 6/1964 | Bloch | 206/815 |
| 3,565,282 | 2/1971 | Staar | 206/387 |
| 3,932,895 | 1/1976 | Ward | 206/312 |

OTHER PUBLICATIONS

IBM, Technical Disclosure Bulletin, Dec. 1976, p. 2690, vol. 19, No. 7.

Primary Examiner—William T. Dixson, Jr.
Attorney, Agent, or Firm—Keith T. Bleuer

[57] ABSTRACT

A magazine particularly for magnetic diskettes, such as of the type disclosed in U.S. Pat. No. 3,668,658, including nearly square side panels, and oblong top and back panels and a bottom connecting the side panels leaving one end of the magazine open for withdrawal of diskettes stored therein. The inside surfaces of the top panel and bottom have corresponding grooves formed therein for reception of the diskettes in vertical disposition, and the grooves in the bottom are narrower than the grooves in the top to provide accurate positioning of the diskettes at their bottoms while allowing a little warp of the diskettes about vertical axes. The inside surface of the back panel is plane and unribbed to accommodate slight diskette warp about horizontal axes. A spring wire retainer extends upwardly from the magazine bottom across the lower part of the open end of the magazine to releasably retain diskettes in the magazine, and the side panels are notched close to the magazine bottom to allow an easy gripping of the diskettes adjacent the magazine bottom for withdrawal of the diskettes.

2 Claims, 6 Drawing Figures

MAGNETIC DISKETTE MAGAZINE

CROSS REFERENCES TO RELATED APPLICATIONS

The diskette magazine herein described may be used in the disk drive machine disclosed in the copending application of W. E. Beuch and M. N. Zell, Ser. No. 888,603, filed Mar. 20, 1978 and in the copending application of D. O. Castrodale and T. Fournier, Ser. No. 888,437, filed Mar. 20, 1978, and a lid for the magazine is disclosed in a copending application of D. R. Wilson, et al, Ser. No. 888,438, filed Mar. 20, 1978. A clothespin like reciprocable picker device useful with the diskettes as stored in the magazine is disclosed in W. E. Beuch and M. N. Zell patent application, Ser. No. 888,601, filed Mar. 20, 1978. The diskette magazine as a design is also shown in the copending application of D. Wilson, F. Wilkey and W. Aderman, Ser. No. 888,436, filed Mar. 20, 1978.

BACKGROUND OF THE INVENTION

The invention relates to magazines and more particularly to magazines suitable for containing jacketed magnetic disks (which may be termed "diskettes") of the type disclosed in U.S. Pat. No. 3,668,658 and holding series of the diskettes in spaced vertical disposition.

Article carrying trays have previously been proposed, as in U.S. Pat. No. 3,885,668, having vertical partitions for holding mail, for example, in vertical disposition separated into bundles defined by the partitions. It has also been proposed that bails be utilized in connection with a container having an open top, as in U.S. Pat. No. 3,940,018, with the bails being swingable over the top open end of the container for holding the contents of the container in place. Such receptacles, however, are not suitable for use for holding a series of diskettes in vertical disposition and would not allow horizontal movement of the diskettes out of the receptacle while they remain vertical and would not support the diskettes on their top and bottom edges and do not provide releasable locking means for preventing diskettes from sliding out of the receptacle.

It is therefore an object of the present invention to provide an improved magazine which is particularly suitable for holding magnetic diskettes in vertical spaced dispositions, which has one open end for movement of the diskettes out of the magazine and which has releasable locking means for the diskettes effective particularly adjacent their lower edges for preventing the diskettes from being withdrawn or sliding out of the magazine when this is not required. It is a more particular object of the invention to provide a locking means which constitutes a spring wire imbedded in the bottom of the magazine and having a medial portion that extends across the lower portion of the opening of the magazine for releasably preventing the diskettes from moving out of the magazine.

It is also an object of the invention to provide an improved diskette magazine having internal grooves for receiving the upper and lower edges of the diskettes with the grooves for the lower edges being of less width than the grooves for the upper edges whereby to provide for diskettes which may be slightly warped about vertical axes while maintaining the diskettes accurately registered at their lower edges.

It is also an object of the invention to provide an improved diskette magazine which holds the upper and lower edges of the diskettes apart by means of spaced ribs and which includes a rear panel that is smooth, plane and unribbed so that diskettes having slight warps about vertical axes may be moved fully into the magazine without impedance.

DESCRIPTION OF THE PREFERRED EMBODIMENT

Figure 1:
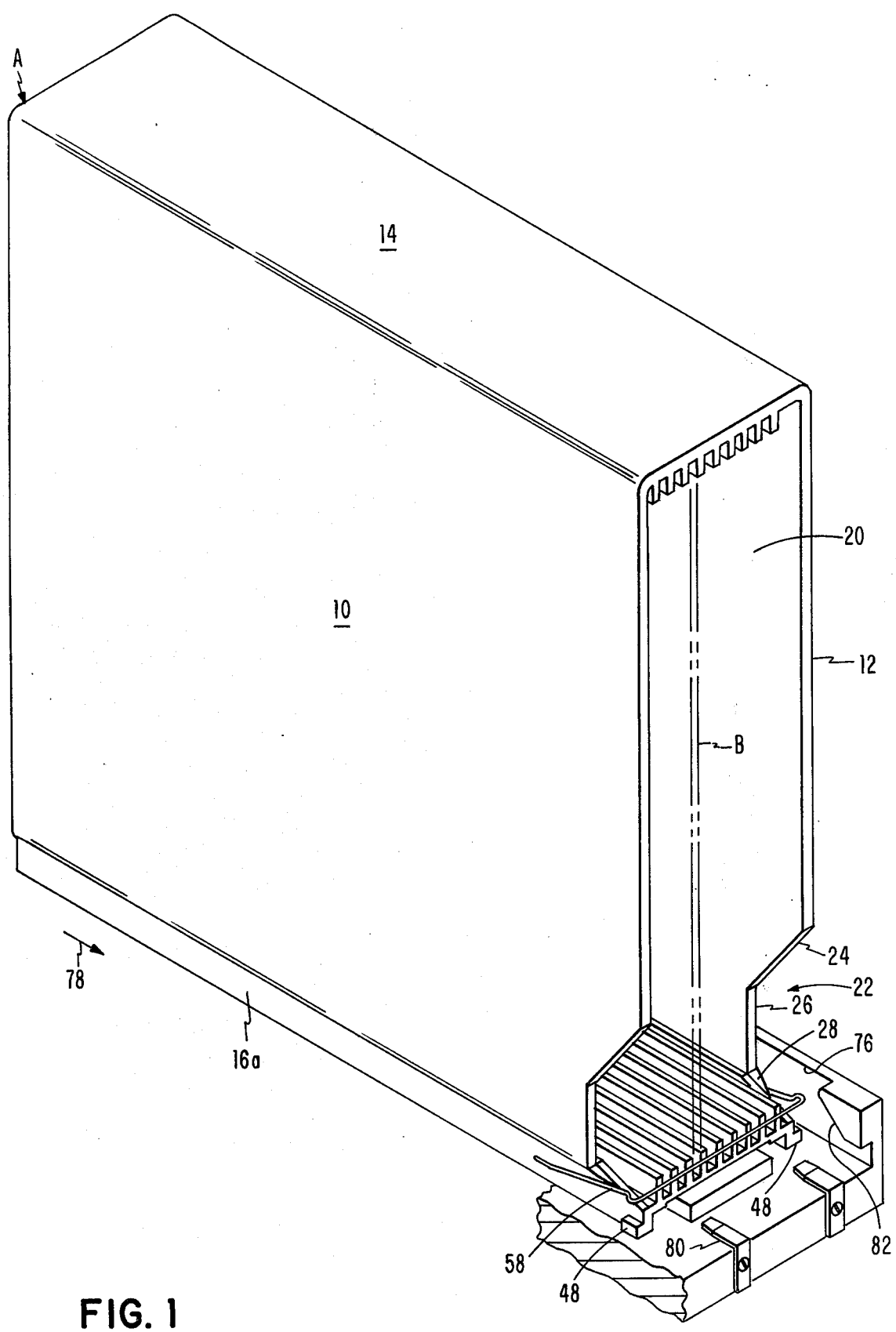
FIG. 1 is an isometric view of a magnetic diskette magazine incorporating the principles of the invention and showing the magazine being inserted into a retaining cavity of a disk file machine, for example.

Referring to FIGS. 1–4, the magazine A therein illustrated may be seen to comprise two nearly square side panels 10 and 12. The side panels are connected by a top panel 14, a bottom 16 and a back panel 18. The forward end of the magazine A opposite the back panel 18 is open and provides an opening 20 into the magazine. The panels 10 and 12 are parallel with each other, and the panel 14, the bottom 16 and the end 18 are thus of equal widths which are considerably less than their lengths, as shown.

Figure 2:
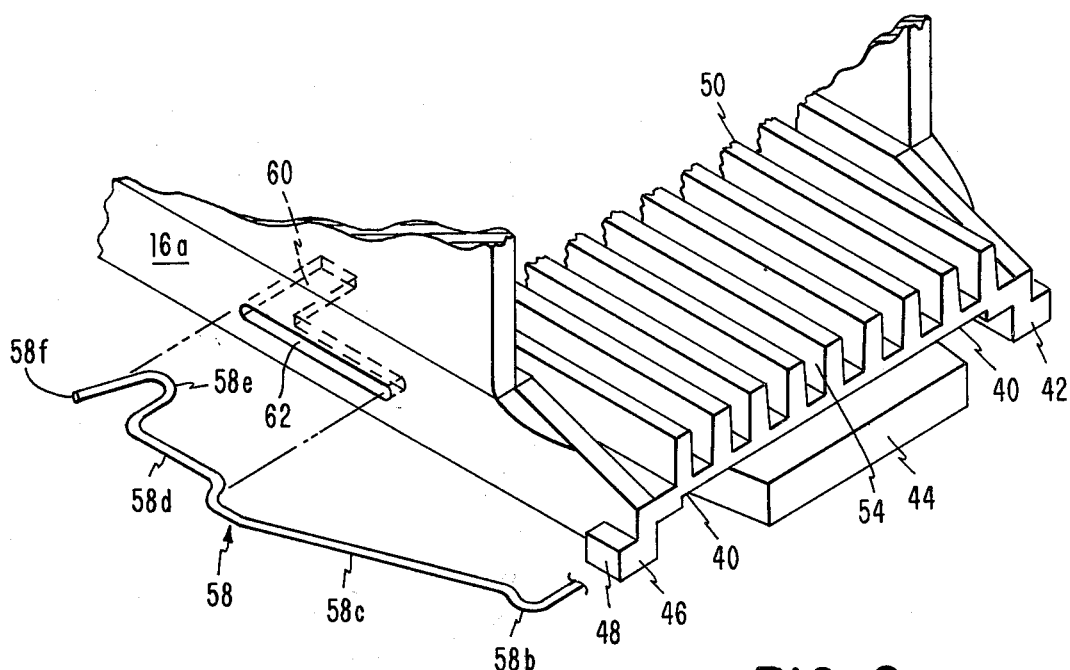
FIG. 2 is an isometric view on an enlarged scale of the lower fore-part of the magazine.
Figure 6:
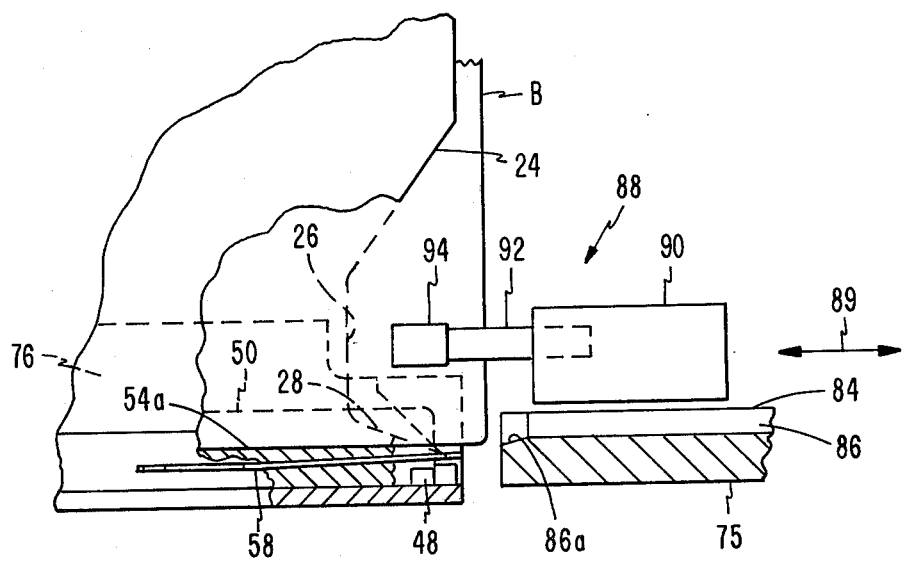
FIG. 6 is a fragmentary side elevational view of the magazine and of the disk file machine with a diskette being shown partially out of the magazine.

Each of the side panels 10 and 12 is provided with an edge notch 22 which extends from the front edge of the magazine toward the back panel 18. The notches 22 are at and in communication with the bottom 16 and are relatively remote from the top panel 14 as shown in FIGS. 1, 2 and 6 in particular. The notches 22 are each formed by edge portions 24, 26 and 28 of the panels 10 and 12. The back panel 18 is provided with depressed areas 30 and 32 for labels and with a depression 34 which is deeper than the depressions of the areas 30 and 32 and which connects the areas 30 and 32 for easy label removal (see FIG. 4). The back panel 18 is also provided with an upwardly and inwardly extending notch 36 adjacent the bottom 16 which may receive a latch for retaining the magazine in position in a disk file machine. An opening or window 38 is provided in the back panel 18 adjacent the top 14.

The bottom 16 on the fore-portion of the magazine A is formed with a pair of notches 40 disposed between forwardly extending protrusions 42, 44 and 46 (see FIG. 2). A pair of sidewardly extending stops 48 are provided on the protrusions 42 and 46. The magazine bottom 16 is formed on its internal surface with upwardly extending ribs 50, and the magazine top 14 is formed on its internal surface with an equal number of downwardly extending ribs 52 (see FIG. 3). The ribs 50 provide grooves 54 between them, and the ribs 52 provide grooves 56 between them. The ribs 52 are narrower in cross section than the ribs 50, so that the bases or root portions 56a of the grooves 56 are wider than the bases or root portions 54a of the grooves 54. Otherwise, the grooves 56 are in vertical alignment with the grooves 54. Sides of end grooves 54 and 56 are formed by an inwardly extending portion 12a and an inwardly extending side rib 12b on panel 12 which in effect make the end grooves 54 and 56 of the same effective widths as the other grooves 54 and 56. Similar inwardly extending portions 10a and 10b formed in the side panel 10 have the same effect with respect to the opposite end grooves 54 and 56. The inner surface 18a of the back panel 18 is smooth, plane and unribbed as is clear from FIG. 3.

All of the parts of the magazine A previously mentioned herein are integral with each other, and the magazine A with all of its parts may constitute a single molding of plastic. All of the faces of the various parts of the magazine A are very smooth so that the magazine surfaces may have nearly zero draft. Therefore, viewing the magazine from the top and in particular viewing the magazine top 14, the magazine appears to be oblong in shape rather than tapering in any discernible respect from the forward end to the back panel 18.

Figure 3:
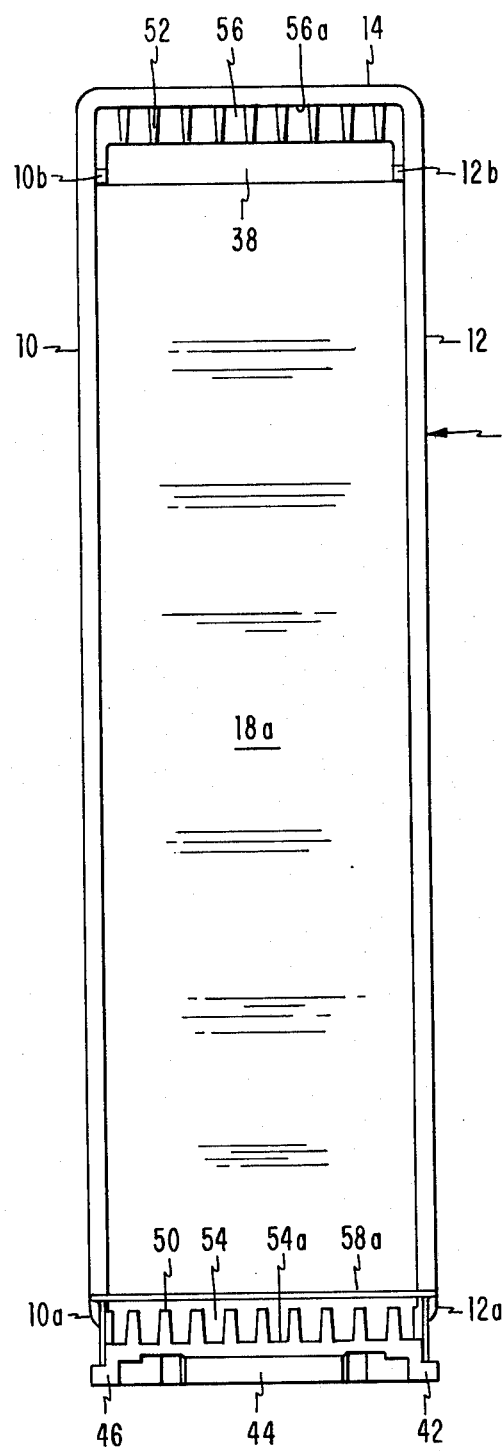
FIG. 3 is a front elevational view of the magazine.

A diskette retainer 58 in the form of a U-shaped spring wire extends from one side 16a of the magazine bottom 16 to its other side 16b. The retainer 58 has a transversely extending medial portion 58a; and, in the unstressed condition of the retainer 58, the medial portion 58a has an elevation slightly higher than the upper ends of the ribs 50 as is shown in FIG. 3. The retainer 58 also has a pair of opposite semiloop portions 58b at the ends of the portion 58a, opposite straight portions 58c, a pair of additional opposite straight portions 58d connected to the portions 58c, and a pair of return bent portions 58e terminating at the ends 58f of the wire. The retainer 58 is installed on the magazine A by moving the portions 58e into a pair of opposite inwardly extending relatively deep slots 60 in the opposite side surfaces 16a and 16b of the magazine bottom 16 and moving the straight portions 58d into a pair of relatively long, shallow slots 62 in the opposite side surfaces 16a and 16b. The return bent portions are wedged into the slots 60, and the wire ends 58f dig into ends of the slots 60 and hold the retainer 58 in place. The retainer portions 58d and 58e and the sides of the slots 60 and 62 effectively anchor the U-shaped retainer 58 at its two ends to the magazine A, and only the retainer portions 58c, 58b and 58a are then outside of the magazine A. The portions 58c lie along and are in sliding contact with the exterior side surfaces 16a and 16b of the bottom 16, and they extend upwardly from the slot 62 to the outwardly extending portions 10a and 12a of the side panels 10 and 12. The portion 58a extends transversely across the opening 20 and, as mentioned, is at a level higher than the upper ends of the ribs 50. The semiloop portions 58b are spaced apart farther than the distance between the exterior surfaces 16a and 16b of the magazine bottom 16 and have a spacing substantially equal to the spacing between the stops 48. The retainer 58 may then be swung downwardly against the spring action of the parts 58c principally, and the stops 48 limit this downward movement. The portions 58b make contact with the stops 48 in this case, and under these conditions the transversely extending medial portion 58a of the retainer 58 lies below the groove bases 54a as the magazine A is shown in FIG. 3.

Figure 5:
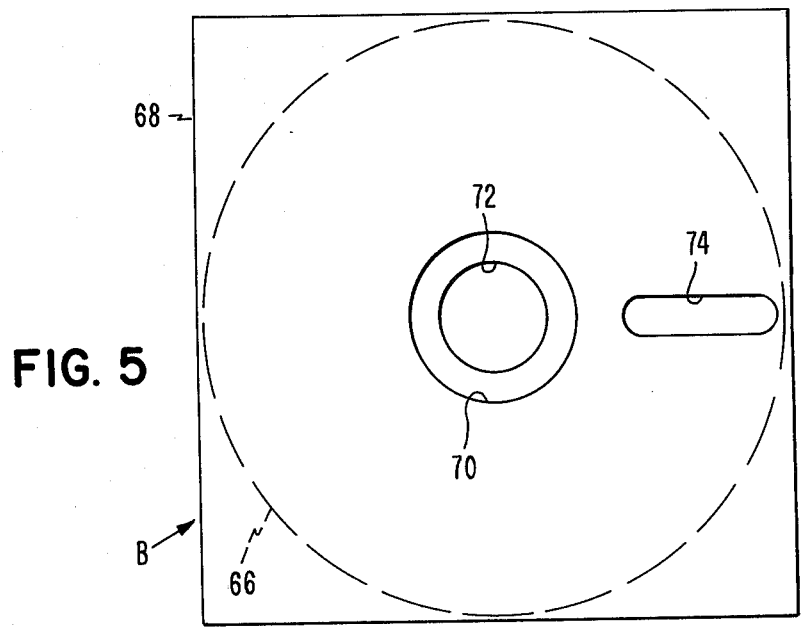
FIG. 5 is a side elevational view of a diskette or magnetic disk-jacket assembly that may be used in the magazine.

A plurality of diskettes B (see FIG. 5) may be used in the magazine A. The diskette B shown in FIG. 5 is thin (of about 1.5 mm thickness, for example) and substantially flat and includes a thin flexible magnetic disk 66 enclosed in a jacket 68 of somewhat thicker less flexible material. The jacket 68 is provided with opposite central openings 70 through it revealing the central portion of the disk 66 having a hole 72 through it. The jacket 68 is also provided with a pair of opposite radial slots 74 in its two thicknesses through which magnetic transducers may extend for the purpose of data transfer with respect to the disk 66. A diskette of this type is disclosed in U.S. Pat. No. 3,668,658 which may be referred to for further detail.

Figure 4:
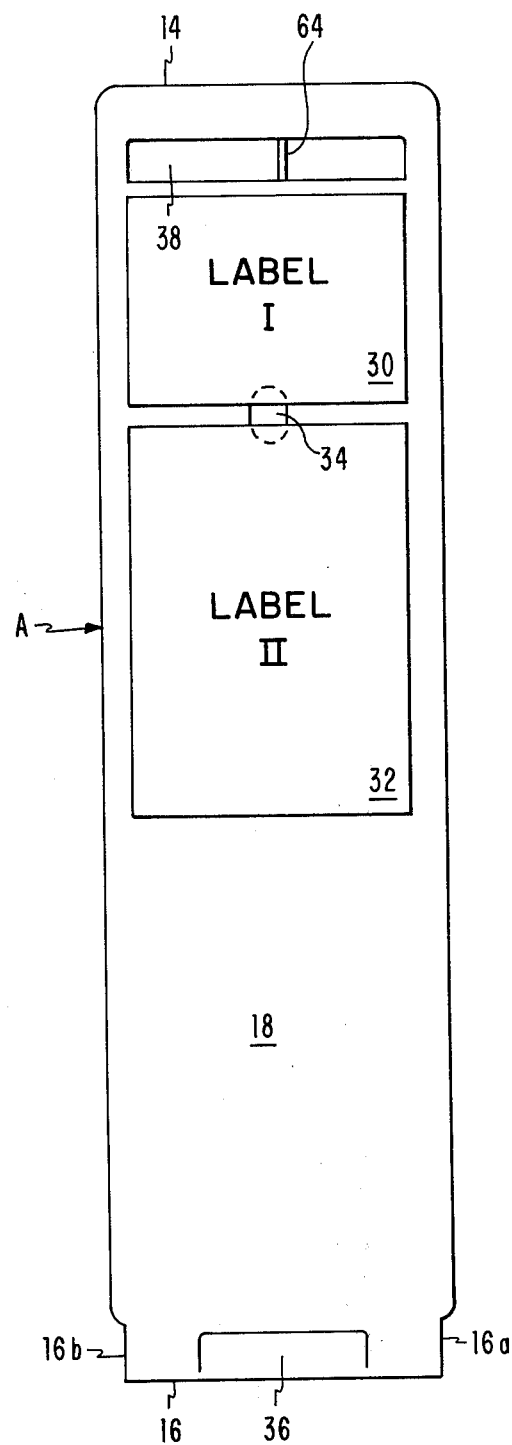
FIG. 4 is a rear elevational view of the magazine.

The magazine A may be loaded with diskettes B by manually depressing the retainer 58 so that its portions 58c make contact with the stops 48. Under these conditions, the transversely extending medial portion 58a of the retainer 58 is below the groove bases 54a, and the diskettes 64 may be slid into position in opposite grooves 54 and 56. One of such diskettes B is shown in dot and dash lines in FIG. 1. The diskettes B when they bottom on the internal surface of the back panel 13 are completely within the magazine A and have their end surfaces substantially coincident with the ends of the ribs 50 and 52. When one or more of the diskettes B are thus installed in place in the magazine A, the retainer 58 is released; and it then springs up under its inherent spring action (principally of parts 58c) to have its medial portion 58a in the position shown in FIG. 3. The diskettes B are thus held from falling out of the magazine A by the retainer 58, since the medial portion 58a is in the path of travel of the diskettes B through the corresponding slots 54. The diskettes B are visible through the window 38 from the back of the magazine as shown in FIG. 4, and it is thus possible to determine how many of the diskettes B are within the magazine A even though the opening 20 is not visible to the operator.

The magazine A with one or more of the diskettes B loaded in it may be used in a disk drive machine, for example, a portion 75 of which is shown in FIGS. 1 and 6. The machine portion 75 includes a recess 76 of appropriate size and shape to receive the magazine A, and the magazine A is slid into the recess 76 in the direction 78. A pair of spaced magazine guides 80 extend into the recess 76, and they are of appropriate spacing and size so that they are received into the notches 40 in the magazine bottom 16 when the magazine A is moved toward the end of the recess 76. The guides 80 are beveled on their ends so that the guides 80 cam the magazine A sidewardly into proper position in the recess 76, and the guides 80 hold the magazine A in this position after the magazine A has been moved to the end of the recess 76 in the direction 78. A pair of opposite cam surfaces 82 are provided at the ends of the recess 76, and these are so spaced that the semiloop portions 58b of the retainer 58 move into contact with the cam surfaces 82 and are thereby cammed downwardly as the magazine A completes its movement in the direction 78 to the end of the recess 76. The medial portion 58a moves downwardly along with the semiloop portions 58b and is thus moved out of alignment with the slots 54 so that diskettes B in the magazine A may then be pulled through the opening 20 out of the magazine.

The disk drive machine includes a pair of spaced ribs 84 providing a diskette receiving slot 86 between them (see FIG. 6). The bottom of the slot 86 is slightly higher than the bases of the grooves 54a so that even though a diskette B is partially within the magazine A when the diskette B is used for data transfer, nevertheless the diskette B is free of the base surfaces 54a of the grooves 54. The slot 86 has an upper slanting initial portion 86a that moves a diskette B to the higher level of the bottom of the slot 86 as the diskette B is being moved out of the magazine A. The machine may include a reciprocative clothespin type picker device 88 moveable in path 89 for drawing a diskette B out of the magazine A. The device 88 includes a base portion 90 and a pair of arms that swing together under spring force. For this purpose, one of the arms may be a leaf spring arm 92 having a tip 94 of rigid material. The arms have diverging cam surfaces on their distal ends similar to such surfaces on an ordinary clothespin so that the picker device 88 may be moved onto a diskette B and be spread apart thereby in order to grip the diskette B for subsequent withdrawal by the picker device 88 out of the magazine A. The picker device more particularly may be of the type disclosed in said Beuch et al application Ser. No. 888,601, filed Mar. 20, 1978. The picker device 88 moves in path 89 inwardly of the magazine A into the edge notches 22, substantially midway vertically of the edge portions 26; and the notches 22 allow such movement of the picker device 90 into the magazine A even though it is one of the end diskettes B in the magazine A which is in alignment with the picker device 88 and which is the diskette to be drawn out of the magazine A into the slot 86 by the picker device 88.

The bottom grooves 54 are somewhat narrower than the top grooves 56 as previously described, and each of the bottom grooves 54 thus quite accurately locates a diskette B with respect to the reciprocative picker device 88 which is restricted to no substantial movement transversely of the recess 76 and guides 80. The upper grooves 56 are and may be wider than the grooves 54, since the picker device 90 is located quite close to the magazine bottom 16. Thus, even though the diskettes B may be slightly warped in the directions of the grooves 56 (about vertical axes), nevertheless, the magazine A provides a minimum restraining force on the diskettes as they are drawn out of the magazine A by the picker device 88.

The path 89 of travel of the picker device 88 and the notches 22 allowing useage of the picker device 90 are at levels quite close to the bottom 16, and there is thus a minimum of couple and associated frictional restraint on the diskettes B as they are drawn by device 88 out of the magazine A into the receiving slot 86 for subsequent data transfer. Due to gravity, the diskettes B naturally tend to rest on the bases 54a of the grooves 54 which thus provide frictional restraint against movement on the diskettes B as they are withdrawn out of the magazine A. Therefore the higher the level at which a pulling force is applied onto the edge of a diskette B appearing in opening 20, the greater will be the couple caused by the frictional restraint on the lower edge of the diskette by a groove base 54a and tending to rotate the diskette B in the magazine A in the clockwise direction as seen in FIG. 1. The greater the couple, the greater will be the binding force by the diskette on the groove bases 54a and 56a and the greater will be the force needed to pull the diskette out of the magazine. Thus it is important to have the levels of the picker path 89 and notches 22 close to the magazine bottom 16.

The notches 22 also facilely allow an operator to remove diskettes B out of the magazine A when the loaded magazine A is free of the disk drive machine. The retainer spring 58 is located close to the notches 22 so that such a removal may even be done with one hand. Also, spring 58 is advantageously located close to the magazine bottom 16 so that the cam surfaces 82 may be effective to move the medial spring portion 58a downwardly when the magazine A is inserted into the receiving slot 76. The cam surfaces 82 in overcoming the inherent resiliency of the spring 58 push the magazine A downwardly (rather than upwardly), augmenting the effective gravity on the magazine and diskettes and providing a relatively stable combination. The stops 48 advantageously limit the downward movement of the medial spring portion 58a when it is being depressed by hand for manual removal of diskettes B out of magazine A and thus prevent an overstressing of the spring 58.

As previously mentioned, the inside surface 18a of the back panel 18 is plane, smooth and unribbed. Therefore, there is no impediment to full movement of a diskette B into magazine A which might be caused by ribs on surface 18a. The diskettes B may be slightly warped vertically (about horizontal axes), and thus their ends contacting the back panel 18 may possibly be slightly curved which might cause mismatch with any ribs on surface 18a.

The window 38 allows the operator to inspect the magazine A from its back and determine whether all of the slots 56 have diskettes B within them. This is advantageous, since the disk drive machine probably will completely close the magazine opening 20 when the magazine A is in position in the machine.

I claim:

1. A magazine for containing a series of thin, flat, rectangular articles of a type subject to warpage and disposed in the magazine in vertical, spaced disposition comprising:
   a magazine bottom, top panel and end panel effectively connected together and leaving the other end of the magazine open through which the articles may be withdrawn, and
   a series of vertically aligned ribs within said magazine bottom and top panel extending longitudinally of said bottom and top panel and providing pairs of vertically aligned grooves having parallel root portions so that the grooves may receive said articles and hold them vertical and spaced with respect to each other,
   said grooves on said bottom being relatively narrow so as to accurately hold the bottom edges of said articles in spaced disposition so that a clothespin like picker device movable in a predetermined path close to and parallel with the bottom edges of said articles may reliably grip selected ones of the articles prior to pulling them out of the magazine, said grooves within said magazine top panel being relatively wide in comparison with said grooves in said bottom and said end panel being plane, smooth and unribbed on its inside surface allowing warpage of said articles out of flatness with substantially no binding of said articles in the magazine to prevent their free movement out of the magazine through said open end of the magazine.

2. A magazine for containing a series of thin, flat, rectangular articles in vertical, spaced disposition comprising:
   a magazine bottom, top panel, end panel and opposite side panels all connected together and leaving the other end of the magazine open through which the articles may be withdrawn, and
   a series of vertically aligned ribs within said magazine bottom and top panel extending longitudinally of said bottom and top panel and providing pairs of vertically aligned grooves having parallel root portions so that the grooves may receive said articles and hold them in vertical, spaced disposition, said magazine bottom, top panel and opposite side panels all terminating in substantially the same plane at said open end of the magazine having aligned notches in said opposite side panels located at and in communication with said magazine bottom and extending from the open end of the magazine toward said end panel whereby each of said thin articles may be gripped adjacent said bottom and pulled in vertical disposition out of said magazine without the frictional restraint on the bottom edge of the article by the root portion of its groove in said bottom providing a substantial couple on the article which would tend to wedge the article between the root portions of its grooves in said top panel and bottom.

* * * * *